(12) United States Patent
Yasuda et al.

(10) Patent No.: US 7,956,766 B2
(45) Date of Patent: Jun. 7, 2011

(54) APPARATUS OPERATING SYSTEM

(75) Inventors: Kei Yasuda, Nishinomiya (JP);
Yoshihiko Motohashi, Osaka (JP);
Kohji Okuno, Osaka (JP)

(73) Assignee: Panasonic Corporation, Osaka (JP)

( * ) Notice: Subject to any disclaimer, the term of this patent is extended or adjusted under 35 U.S.C. 154(b) by 1520 days.

(21) Appl. No.: 10/750,830

(22) Filed: Jan. 5, 2004

(65) Prior Publication Data
US 2004/0135701 A1 Jul. 15, 2004

(30) Foreign Application Priority Data

Jan. 6, 2003 (JP) ................................. 2003-000262

(51) Int. Cl.
*G05B 19/02* (2006.01)
*H04M 3/00* (2006.01)
*H04B 1/00* (2006.01)
*H04B 3/00* (2006.01)
*H04R 29/00* (2006.01)

(52) U.S. Cl. .............. 340/825.24; 340/825.22; 455/420; 455/42.1; 381/58; 381/77

(58) Field of Classification Search ............... 381/58, 381/56, 77, 104–109; 379/102; 340/825.22; 455/42.1, 420, 421.1
See application file for complete search history.

(56) References Cited

U.S. PATENT DOCUMENTS

| | | | | |
|---|---|---|---|---|
| 5,528,673 A * | 6/1996 | Rosenthal | ............... | 379/102.03 |
| 6,650,894 B1 * | 11/2003 | Berstis et al. | ................. | 455/420 |
| 6,686,839 B2 * | 2/2004 | Chou et al. | ................. | 340/540 |
| 6,876,310 B2 * | 4/2005 | Dunstan | ................. | 340/825.49 |
| 6,980,079 B1 | 12/2005 | Shintani et al. | | |
| 6,983,306 B1 | 1/2006 | Sameshima et al. | | |

FOREIGN PATENT DOCUMENTS

| | | |
|---|---|---|
| JP | 5-14453 | 1/1993 |
| JP | 9-186540 | 7/1997 |
| JP | 2000-175275 | 6/2000 |
| JP | 2001-86572 | 3/2001 |
| JP | 2001-145174 | 5/2001 |

* cited by examiner

*Primary Examiner* — Devona E Faulk
*Assistant Examiner* — George Monikang
(74) *Attorney, Agent, or Firm* — Wenderoth, Lind & Ponack, L.L.P.

(57) ABSTRACT

Each apparatus transmits to a control server a notification signal indicative of a pending change or a change in an output state of the apparatus. The control server has stored therein a control rule which associates an output state of one apparatus with an output state to be taken by another apparatus when the one apparatus is in the output state. The control server acquires location-related information which is set in association with a location of each apparatus. Then, the control server receives a notification signal from any one of the apparatuses, and in response to the notification signal, determines an output state to be taken by an operation target apparatus which is other than an apparatus having transmitted the notification signal, based on the control rule and the location-related information. Further, the control server operates the operation target apparatus so as to transition into an output state determined by a determination section.

6 Claims, 10 Drawing Sheets

FIG. 2

| NOTIFICATION APPARATUS | | OPERATION TARGET APPARATUS | | NUMERICAL VALUES FOR DETERMINING OPERATION FEASIBILITY | | |
|---|---|---|---|---|---|---|
| APPARATUS | OUTPUT STATE | APPARATUS | DETAILS OF OUTPUT STATE TO BE TAKEN | EXECUTION DETERMINATION VALUE | BASIC PRIORITY VALUE | DISTANCE COEFFICIENT |
| RADIO | TURNED ON | TV | SOUND LEVEL 0 | 30 | 50 | 4 |
| RADIO | SOUND LEVEL 20 OR MORE | TV | SOUND LEVEL 0 | 30 | 50 | 0 |
| TV | TURNED ON | RADIO | TURNED OFF | 30 | 50 | 10 |
| TV | SOUND LEVEL 20 OR MORE | RADIO | TURNED OFF | 30 | 50 | 10 |
| TELEPHONE | OCCURRENCE OF RING | RADIO | SOUND LEVEL 0 | 30 | 50 | 5 |
| TELEPHONE | OCCURRENCE OF RING | TV | SOUND LEVEL 0 | 30 | 50 | 5 |

FIG. 3

| APPARATUS | DISTANCE (m) |
|---|---|
| TV-RADIO | 4 |
| TV-TELEPHONE | 3.5 |
| RADIO-TELEPHONE | 1 |

FIG. 6

| APPARATUS ID | APPARATUS TYPE | STATE INFORMATION |
|---|---|---|
| 1 | TV | TURNED OFF |
| 2 | RADIO | TURNED ON, SOUND LEVEL 20 |
| 3 | TELEPHONE | TURNED ON, NO RINGTONE |

FIG. 7

| TIME | TIME COEFFICIENT |
|---|---|
| 0 AM TO 4 AM | 0 |
| 4 AM TO 8 AM | +20 |
| 8 AM TO 12 PM | +20 |
| 12 PM TO 4 PM | +20 |
| 4 PM TO 8 PM | -30 |
| 8 PM TO 0 AM | -30 |

F I G. 9

| APPARATUS WHOSE OUTPUT STATE HAS CHANGED | | OPERATION TARGET APPARATUS | | NUMERICAL VALUES FOR DETERMINING OPERATION FEASIBILITY | | |
|---|---|---|---|---|---|---|
| APPARATUS | DETAILS OF OUTPUT STATE | APPARATUS | DETAILES OF OUTPUT STATE TO BE TAKEN | EXECUTION DETERMINATION VALUE | BASIC PRIORITY VALUE | DISTANCE COEFFICIENT |
| INTERCOM | BUTTON DEPRESSED | RADIO | SOUND LEVEL 0, RESTORED 3 SEC. LATER | 3 0 | 5 0 | 5 |
| INTERCOM | BUTTON DEPRESSED | TV | SOUND LEVEL 0, RESTORED 3 SEC. LATER | 3 0 | 5 0 | 5 |

…

APPARATUS OPERATING SYSTEM

BACKGROUND OF THE INVENTION

1. Field of the Invention

The present invention relates to an apparatus operating system, and more particularly to an apparatus operating system for controlling an apparatus based on an operation state of another apparatus.

2. Description of the Background Art

Conventionally, many types of audio apparatuses, including a television set, a radio and a stereo apparatus, have been used in a household, and it is often that a plurality of audio apparatuses are installed in one room. In a case where a plurality of audio apparatuses are installed in one room, a user is likely to use the audio apparatuses so as not to all simultaneously output sound, or likely to lower a sound level of one audio apparatus when another audio apparatus outputs sound. For example, in a case of turning on the radio when the television set is in operation, the user may lower the sound level of the television set in order to increase audibility of sound from the radio or may mute the sound from the television set. Accordingly, the user is required to perform an operation to control the sound level of the television set as well as an operation to turn on the radio.

For example, as conventional technology for operating an apparatus in accordance with surrounding situations, there has been a proposed technology for automatically controlling a sound level of an apparatus in accordance with a surrounding sound level. Specifically, this technology is intended for use in an audio apparatus for audio reproduction in an interior of a car, and is intended for automatically controlling, in accordance with a surrounding noise level, a sound level of the audio apparatus so as to increase audibility of sound therefrom.

As described above, conventionally, in a case of turning on the radio when the television set is in operation, the user is required to perform an operation to control the sound level of the television set as well as to turn on the radio. Accordingly, in a case of simultaneously operating a plurality of audio apparatuses, when one audio apparatus is controlled, another audio apparatus also has to be controlled. In this manner, conventionally, in a case of changing the sound level of one apparatus, the user is required to control another apparatus, and such control of apparatuses requires additional effort from the user. Moreover, considerable time is taken between the user operating one audio apparatus and controlling the sound level of another audio apparatus. Sound from a first audio apparatus is difficult to hear until the sound level of another audio apparatus is controlled, and therefore it is conceivable that the user might miss an opportunity to hear important information.

The above-described conventional technology for automatically controlling the sound level of the apparatus in accordance with the surrounding sound level is assumed to be applied to only one audio apparatus but not simultaneously applied to a plurality of audio apparatuses. Accordingly, in the conventional technology, for example, when two audio apparatuses are installed in one room, no determination can be made as to which audio apparatus deserves a higher priority concerning the sound level. Specifically, in a case where two audio apparatuses are simultaneously in operation, when a total sound level of the two audio apparatuses is excessively high, no determination can be made as to an extent to which the sound level should be reduced. Therefore, even if the above-described conventional technology is employed, a situation where a plurality of audio apparatuses are used cannot be handled successfully.

In a case where the apparatus is an apparatus other than an audio apparatus, it is conceivable that operations similar to those performed for a case of the audio apparatus can be performed when a plurality of apparatuses of the same type, e.g., heating apparatuses such as an air-conditioner/heater and an electric carpet, are installed in one place. Specifically, in a case of turning on the air-conditioner/heater when the electric carpet is in operation, a user would lower a temperature setting of the electric carpet or would turn off the electric carpet. In this manner, in a case where the plurality of heating apparatuses are installed in one place, a problem similar to that which occurs in the case of the audio apparatus may arise.

SUMMARY OF THE INVENTION

Therefore, an object of the present invention is to provide an apparatus operating system capable of controlling operation between a plurality of apparatuses of the same type without causing a user to perform excessive operations.

The present invention has following features to attain the object mentioned above.

A first aspect of the present invention is directed to an apparatus operating system including at least two apparatuses which provide output of the same type, and a control server capable of communicating with each apparatus. Here, each apparatus includes a communication section for transmitting to the control server a notification signal indicative of a pending change or a change in an output state of the apparatus. The control server includes a control rule storage section, a location-related information acquiring section, a determination section, and an operating section. The control rule storage section has stored therein a control rule which associates an output state of one apparatus with an output state to be taken by another apparatus when the one apparatus is in the output state. The location-related information acquiring section acquires location-related information which is set in association with a location of each apparatus. The determination section receives the notification signal from any one of the at least two apparatuses, and in response to the notification signal, determines an output state to be taken by an operation target apparatus which is other than an apparatus having transmitted the notification signal, based on the control rule and the location-related information. The operating section operates the operation target apparatus so as to transition into the output state determined by the determination section.

Note that each apparatus is an apparatus for outputting sound, for example. In this case, an output state of each apparatus corresponds to a level of sound outputted from the apparatus. Alternatively, each apparatus may be an air-conditioning and/or heating apparatus. In this case, the output state corresponds to a temperature set by the apparatus.

Further, the communication section may transmit the notification signal when there is a pending increase or an increase of output of the apparatus. In this case, the control rule associates the increase of the output of the apparatus with a reduction of output of another apparatus, and the determination section determines the output state of the operation target apparatus so as to reduce output of the operation target apparatus.

Furthermore, the determination section may derive from the location-related information a distance between the apparatus having transmitted the notification signal and the operation target apparatus, and if this derived distance is equal to or more than a predetermined distance, the determination section may determine not to change the output state of the operation target apparatus.

Further still, the communication section may transmit the notification signal when the user has performed an operation of changing the output state of the apparatus.

Further still, the communication section may transmit the notification signal in a case where the output state of the apparatus temporarily changes for a predetermined time period. In this case, the apparatus operating system further includes a state storage section for storing a pre-operation output state of the operation target apparatus. The operating section operates the operation target apparatus such that the operation target apparatus transitions into the output state determined by the determination section, and after a lapse of the predetermined time period, the operating section operates the operation target apparatus such that the operation target apparatus transitions into the output state stored in the state storage section.

Further still, the control rule may associate an output state to be taken by the apparatus with a condition for operating the apparatus so as to transition into the output state. In this case, the control server further includes a determination section which uses the location-related information to determine whether the condition is satisfied, and the operation executing section operates the operation target apparatus only when the determination section determines that the condition is satisfied.

Note that the present invention may be provided in the form of only a control server included in the above-described apparatus operating system or in the form of a program implemented by a computer included in the control server. Alternatively, the present invention may be provided as a method for use in the apparatus operating system.

In the present invention, the control rule provided in consideration of the location-related information is used, and therefore it is possible to automatically control output states of a plurality of apparatuses in consideration of a relationship between the apparatuses. Accordingly, it is possible to control the apparatuses in such a manner that the apparatuses are operated only when necessary or details of operation vary in accordance with, for example, a distance between the apparatuses.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table illustrating an example of a control rule stored in a control rule storage section 43 shown in FIG. 1;

FIG. 3 is a table illustrating an example of location-related information acquired by a location-related information acquiring section 44 shown in FIG. 1;

FIG. 6 is a table illustrating an example of apparatus information stored in an apparatus information storage section 45 shown in FIG. 5;

FIG. 7 is a table illustrating an example of time information stored in the control rule storage section 43;

FIG. 9 is a table illustrating an exemplary control rule used in the third embodiment;

DESCRIPTION OF THE PREFERRED EMBODIMENTS

First Embodiment

Figure 1:
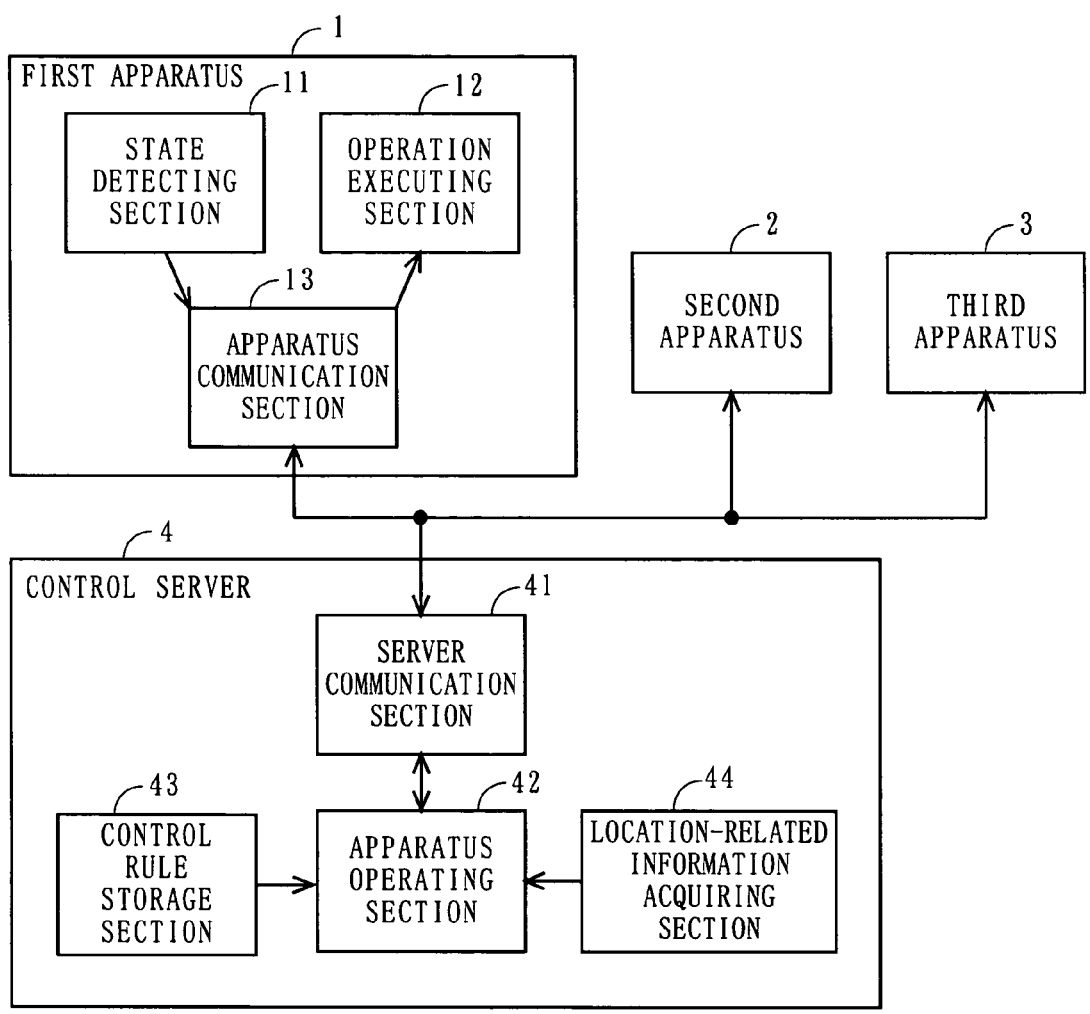
FIG. 1 is a block diagram illustrating structure of an apparatus operating system according to a first embodiment of the present invention.

FIG. 1 is a block diagram illustrating a structure of an apparatus operating system according to a first embodiment of the present invention. In FIG. 1, the apparatus operating system includes a first apparatus 1, a second apparatus 2, a third apparatus 3, and a control server 4. The control server 4 is connected to the first through third apparatuses 1 through 3 in a wired or wireless manner such that the control server 4 is able to communicate with each of the first through third apparatuses 1 through 3. The apparatus operating system illustrated in FIG. 1 is typically used in a household. Each of the first through third apparatuses 1 through 3 is a radio, a television set, or the like, and the control server 4 is a personal computer functioning as a home server, for example. The control server 4 can be connected to each of the first through third apparatuses 1 through 3 via a network such as a home LAN. Each of the first through third apparatuses 1 through 3 provides output of the same type. Specifically, in the first embodiment, each of the first through third apparatuses 1 through 3 outputs sound. More specifically, the first through third apparatuses 1 through 3 are a television set, a radio, and a telephone, respectively. In FIG. 1, although the number of apparatuses connected to the control server 4 is three, any number of apparatuses can be connected to the control server 4 so long as the number of connected apparatuses is equal to or more than two.

In FIG. 1, the first apparatus 1 includes a state detecting section 11, an operation executing section 12, and an apparatus communication section 13. The state detecting section 11 detects a change of an output state of the first apparatus 1. Specifically, in the first embodiment, sound is outputted, and therefore the state detecting section 11 detects a change of an output sound level. Moreover, the state detecting section 11 notifies the apparatus communication section 13 of this detection of the change of the sound level. In response to this notification from the state detecting section 11, the apparatus communication section 13 transmits to the control server 4 a notification signal which indicates that the output state of the first apparatus 1 has changed.

The apparatus communication section 13 receives an operation instruction signal transmitted from the control server 4 to the first apparatus 1. The operation instruction signal is provided in order for the control server 4 to operate an apparatus, and indicates details of operation the control server 4 causes the apparatus to perform. The operation executing section 12 changes the output state of the first apparatus 1 in accordance with the details of the operation notified by the apparatus communication section 13.

Note that although FIG. 1 does not show detailed structures of the second and third apparatuses 2 and 3, similar to the first apparatus 1, each of the second and third apparatuses 2 and 3 includes a state detecting section, an operation executing section, and an apparatus communication section.

In FIG. 1, the control server 4 includes a server communication section 41, an apparatus operating section 42, a control rule storage section 43, and a location-related information acquiring section 44. When the server communication section 41 receives a notification signal, the apparatus operating section 42 determines operations to be performed on apparatuses other than the apparatus from which the notification signal has been transmitted. Note that in the following descriptions, the apparatus from which the notification signal has been transmitted is referred to as a "notification apparatus", and each apparatus other than the notification apparatus is referred to as an "operation target apparatus". A detailed operation of the apparatus operating section 42 will be described later with reference to FIG. 4.

The control rule storage section 43 has a control rule stored therein. The control rule is information indicative of correspondences between output states of a notification apparatus in a specific output state and output states to be taken by apparatuses other than the notification apparatus. The apparatus operating section 42 refers to the control rule to determine details of operation to be performed on the operation target apparatuses.

FIG. 2 is a table illustrating an example of the control rule stored in the control rule storage section 43 shown in FIG. 1. In the table of FIG. 2 illustrating an exemplary control rule, output states of apparatuses (the notification apparatuses) whose output states have changed are associated with output states to be taken by apparatuses (the operation target apparatuses) other than the notification apparatus in a predetermined output state. Specifically, in the control rule, names of the notification apparatuses, the output states of the notification apparatuses, names of the operation target apparatuses, and the output states to be taken by the operation target apparatuses are associated with each other. For example, in the third line of the table of FIG. 2, the notification apparatus "RADIO", the output state of the notification apparatus "TURNED ON", the operation target apparatus "TV", and the output state to be taken by the operation target apparatus "SOUND LEVEL 0" are associated with each other. This means that when the radio is turned on, the television set transitions into such an output state that its sound level is zero. In FIG. 2, the output state to be taken when the radio is on is not defined with respect to the telephone. This is because when the radio is on, the control server 4 performs no operation on the telephone. Regarding the television set and the telephone, as in the case of the radio, the control rule defines output states to be taken by other apparatuses when the output state of the television set or the telephone has changed. Although FIG. 2 uses the names of apparatuses as information for identifying the apparatuses, an apparatus ID assigned for each apparatus may be used instead of using the name of the apparatus, for example.

In the exemplary control rule of FIG. 2, numerical values used for determining operation feasibility are associated with the notification apparatuses and the operation target apparatuses. Specifically, three types of numerical values, i.e., an execution determination value, a basic priority value, and a distance coefficient, are associated with the names and output states of the apparatuses. The apparatus operating section 42 uses these numerical values and the undermentioned location-related information to determine feasibility of an operation to be performed on the operation target apparatuses.

Specific examples of how to determine the feasibility of the operation to be performed on the operation target apparatuses will be described later.

Referring to FIG. 1, the location-related information acquiring section 44 acquires location-related information which is set in association with a location of each of the first through third apparatuses 1 through 3. In the first embodiment, the location-related information indicates distances between the apparatuses (see FIG. 3 which will be described later), and is previously acquired by user input to the location-related information acquiring section 44. The apparatus operating section 42 uses the location-related information to determine whether to control an operation target apparatus. That is, the apparatus operating section 42 determines whether to change an output state of the operation target apparatus, based on the distances between the first through third apparatuses 1 through 3 indicated by the location-related information.

FIG. 3 is a table illustrating an example of the location-related information acquired by the location-related information acquiring section 44 shown in FIG. 1. In the example of FIG. 3, as in the example of FIG. 2, three apparatuses, i.e., the television set, the radio, and the telephone, are connected to the control server 4. As described above, in the first embodiment, the location-related information indicates the distances between the first through third apparatuses 1 through 3, and therefore the acquired location-related information shown in FIG. 3 indicates a distance between the television set and the radio, a distance between the television set and the telephone, and a distance between the radio and the telephone. In the first embodiment, the table as shown in FIG. 3 is previously set by a user. The location-related information acquiring section 44 stores a set table.

Typically, the control server 4 can be realized by a personal computer. Specifically, the apparatus operating section 42 is realized by a CPU of a personal computer implementing a predetermined program (see FIG. 4 which will be described later). The control rule storage section 43 and the location-related information acquiring section 44 are realized by a storage device such as a memory included in the personal computer.

Figure 4:
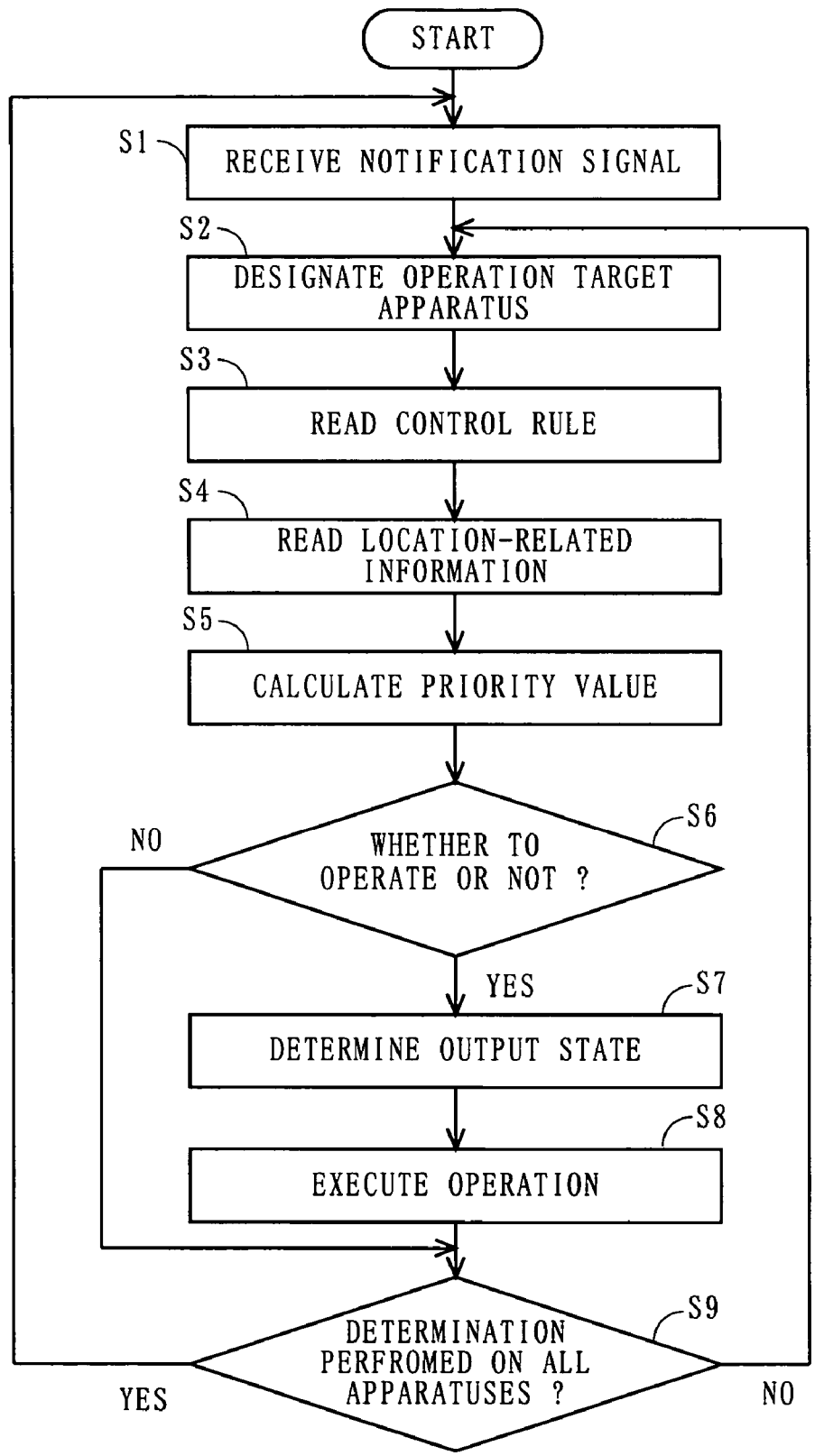
FIG. 4 is a flowchart showing a flow of a procedure of a control server 4 shown in FIG. 1.

Next, a flow of a procedure in the apparatus operating system is described with reference to FIG. 4. FIG. 4 is a flowchart showing a flow of a procedure in the control server 4 shown in FIG. 1. Specifically, the flowchart of FIG. 4 shows a procedure performed by the apparatus operating section 42. For example, the procedure shown in FIG. 4 is started when the control server 4 is activated.

In FIG. 4, first, the apparatus operating section 42 receives a notification signal from anyone of the first through third apparatuses 1 through 3 via the server communication section 41 (step S1). In this case, the notification signal contains information indicative of the name and output state of this apparatus. For example, the information indicative of the output state of the apparatus may be numerical value information indicative of a sound level or a degree of variation of the sound level (e.g., the information indicates that the sound level has increased by 3). Further, information indicative of the output state of the apparatus may indicate that the apparatus has been turned on or off. The information which indicates that the apparatus has been turned on represents that the apparatus is in a state capable of outputting sound, and the information which indicates that the apparatus has been turned off represents that the sound level is zero. Note that the apparatus operating section 42 waits until the notification signal is received.

Next, the apparatus operating section 42 designates one of the operating target apparatuses (step S2). Specifically, one apparatus is designated from among apparatuses other than the apparatus having transmitted the notification signal at step S1. Note that the apparatus operating section 42 is operated in such a manner as not to redesignate the same apparatus having already been designated at step S2 in a previous round of the procedure.

Next, the apparatus operating section 42 reads the control rule stored in the control storage section 43 (step S3). The information read at step S3 does not have to be the entire control rule stored in the control rule storage section 43 and may be a portion of the control rule. For example, consider a case where the control rule storage section 43 has stored therein the control rule as shown in FIG. 2 and a notification signal containing information indicative of the output state "TURNED ON" is transmitted from the notification apparatus "RADIO". In such a case, if the operation target apparatus designated at step S2 is the "TV", at step S3, the apparatus operating section 42 is only required to read a line of the table of FIG. 2 which indicates the notification apparatus "RADIO", the output state "TURNED ON", and the operation target apparatus "TV".

Next, the apparatus operating section 42 reads the location-related information from the location-related information acquiring section 44 (step S4). As step S4, as in step S3, the apparatus operating section 42 does not have to read the entire location-related information stored in the location-related acquiring section 44, and is only required to read a necessary portion of the information. Accordingly, the apparatus operating section 42 reads from the entire location-related information only information indicative of a distance between a destination apparatus having received the notification signal at step S1 and the operation target apparatus designated at step S2.

Next, at steps S5 through S7, the apparatus operating section 42 determines an operation to be performed on the operation target apparatus, based on the control rule read at step S3 and the location-related information read at step S4. Here, an output state to be taken by the operation target apparatus can be specified based on the control rule, and it can be determined as to whether to operate the operation target apparatus, based on a priority value obtained from the location-related information. Details of steps S5 through S7 are described below.

First, the apparatus operating section 42 calculates the priority value (step S5). For calculating the priority value, two numerical values, i.e., a basic priority value and a distance coefficient, included in the control rule, and a value of distance between apparatuses, i.e., the location-related information, are used. Specifically, the apparatus operating section 42 calculates the priority value, for example, using the following expression (1).

$$\text{(Priority value)}=\text{(Basic priority value)}-\text{(Distance between apparatuses)}\times\text{(Distance coefficient)} \quad (1)$$

In the above expression (1), the basic priority value and the distance coefficient are numerical values preset based on the control rule. When the basic priority value and distance coefficient are invariable, the priority value is decreased as the distance between apparatuses becomes greater.

Next, the apparatus operating section 42 determines whether to operate the operation target apparatus designated at step S2 (step S6). This determination at step S6 is performed by comparing the priority value obtained at step S5 with an execution determination value included in the control rule. Specifically, when the priority value is equal to or greater than the execution determination value, the apparatus operating section 42 determines to operate the operation target apparatus. Accordingly, when the distance between apparatuses is lower than or equal to a predetermined distance, the operation target is operated. On the other hand, when the priority value is lower than the execution determination value, the apparatus operating section determines not to operate the operation target apparatus. Accordingly, when the distance between apparatuses is longer than the predetermined distance, the operation target apparatus is not operated.

Processing of steps S5 and S6 is described by taking as an example a case where the control rule shown in FIG. 2 and the location-related information shown in FIG. 3 are used. Here, the notification signal includes information from the apparatus "RADIO" which indicates the output state "TURNED ON", and the "TV" is designated at step S2 as the operation target apparatus. In such a case, as shown in FIG. 2, the basic priority value and the distance coefficient used for obtaining the priority value are 50 and 4, respectively, and as shown in FIG. 3, the distance between the radio and the television set is 4 meters (m). Accordingly, the priority value obtained at step S5 is calculated as follows: $50-(4\times 4)=34$. Then, at step S6, a relationship in size between the priority value and the execution determination value is determined. Here, the priority value and the execution determination value are 34 and 30, respectively, and therefore the priority value is greater than the execution determination value. Accordingly, in this example, the television set is operated.

When it is determined at step S6 that the operation target apparatus is not operated, the apparatus operating section 42 skips processing of steps S7 and S8, and performs processing of step S9. In this case, the apparatus operating section 42 practically determines that the output state to be taken by the operation target apparatus designated at step S2 is the same as the current output state.

On the other hand, when it is determined at step S6 that the operation target apparatus is not operated, processing of step S7 is performed. Specifically, the apparatus operating section 42 determines the output state to be taken by the operation target apparatus designated at step S2 (step S7). The apparatus operating section 42 determines the output state to be taken by the operation target apparatus with reference to the control rule. For example, in a case where the "APPARATUS" and "OUTPUT STATE" included in the notification signal received at step S1 are "TELEPHONE" and "OCCURRENCE OF RINGTONE", respectively, and the operation target apparatus designated at step S2 is "RADIO", the output state to be taken by the operation target apparatus is determined to be "SOUND LEVEL 0".

Following step S7, the apparatus operating section 42 operates the operation target apparatus designated at step S2 so as to transition into the output state determined at step S7 (step S8). Specifically, an operation instruction signal indicative of the output state determined at step S7 is transmitted to the operation target apparatus designated at step S2 via the server communication section 41. An operation executing section of the operation target apparatus having received the operation instruction signal executes such an operation as to cause the operation target apparatus to transition into the output state indicated by the operation instruction signal.

Next, the apparatus operating section 42 determines whether processing of determining the output state has been performed on all operation target apparatuses (step S9). If determination as to the output state has been performed for all operation target apparatuses, the apparatus operating section 42 performs processing of step S1. Accordingly, the apparatus operating section 42 waits until a new notification signal is transmitted from any one of the first through third apparatuses 1 through 3. On the other hand, if there is any operation target apparatus whose output status has not been determined, the apparatus operating section 42 performs processing of step S2. Accordingly, the apparatus operating section 42 repeats processing of steps S2 through S9 until output states of all the apparatuses are determined. Since the apparatus operating section 42 repeats the above steps S1 through S9, it is possible for the control server 4 to control the output state (sound level) of each of the first through third apparatuses 1 through 3.

As described above, in the first embodiment, sound levels of a plurality of apparatuses can be automatically controlled in accordance with distances between the apparatuses. Accordingly, for example, control can be made in such a manner as to automatically lower a sound level of a television set in a case of turning on a radio when the television set is in operation. Further, whether to perform such control can be determined in accordance with a distance between the apparatuses, and therefore sound levels of the apparatuses are not unnecessarily controlled by the apparatus operating system. Specifically, in the above example, there is a possible situation in which the sound level of the television set is not required to be lowered when the television set and the radio are considerably distanced from each other. In the apparatus operating system according to the first embodiment, sound volume of the television set can be controlled only when such control is necessary.

In the first embodiment, the location-related information indicates a distance between apparatuses. However, the location-related information used in other embodiments of the present invention is not limited to this. For example, the location-related information may indicate a location of each apparatus. In such a case, the apparatus operating section 42 obtains a distance between apparatuses from information indicative of the location of each apparatus, and this obtained distance can be used for determining whether to operate the operation target apparatus. Alternatively, in a case where the apparatus operating system is installed, for example, in a house with a plurality of rooms, the location-related information may be a room ID for identifying a room. For example, in a case when the location-related information is the room ID, the apparatus operating section 42 is able to determine whether to operate the operation target apparatus in a manner as described next. Specifically, when the room ID of an apparatus whose output state has changed and the room ID of the operation target apparatus is the same as each other, the apparatus operating section 42 operates the operation target apparatus, and when the room IDs are different from each other, the apparatus operating apparatus 42 does not operate the operation target apparatus. This allows the control server 4 to control outputs of only apparatuses installed in the same room.

Further, in the first embodiment, the location-related information is preset by the user. However, in other embodiments, the location-related information may be automatically acquired by the location-related information acquiring section 44 in a manner as described next. For example, when each apparatus includes a location acquisition device such as a global positioning system (GPS) device, the location-related information acquiring section 44 may acquire location information from each apparatus. Alternatively, when wireless communication is available between two apparatuses, a distance between the apparatuses may be calculated based on a reception level of radio waves transmitted from one apparatus and received by the other apparatus. Alternatively, still, when each apparatus includes a sound detecting device, the distance between the apparatuses may be calculated based on a detection result of sound outputted from one apparatus and detected by the other apparatus. By using a sensitivity level of radio waves or the detection result of sound, it is made possible to acquire such location-related information as to take account of an obstacle, and the like, located between the apparatuses.

Furthermore, in the first embodiment, if the distance between two apparatuses is within a predetermined distance range, an operation of changing the output state is performed on the operation target apparatus, and if the distance between the apparatuses exceeds the predetermined distance range, the output state of the operation target apparatus is not changed. However, other embodiments may use such a control rule as to vary a degree of changing the output state of the operation target apparatus in accordance with the distance between two apparatuses. For example, it is possible to set the control rule such that: if the distance between the apparatuses is less than or equal to 2 m, the sound level of the operation target apparatus is lowered by 10; if the distance between the apparatuses is greater than 2 m and less than or equal to 5 m, the sound level of the operation target apparatus is lowered by 5; and if the distance between the apparatuses is greater than 5 m, the sound level of the operation target apparatus is lowered by 2.

Further still, in the first embodiment, the output state to be taken by the operation target apparatus is determined based on whether the priority value obtained based on the location-related information is equal to or greater than a predetermined value (i.e., whether the priority value is equal to or greater than the execution determination value). In this case, the user is able to set the control rule to any condition by suitably setting the execution determination value, the basic priority value and the distance coefficient of the control rule. For example, the priority value becomes greater by setting the distance coefficient to a smaller value, and therefore as the distance coefficient becomes smaller, it becomes likely to be determined at step S6 of FIG. 4 that the operation target apparatus should be operated. Accordingly, for two apparatuses in which one apparatus is conceived to greatly influence the other apparatus, the distance coefficient may be set to a relatively small value. Moreover, by setting the distance coefficient to zero, it is made possible to make such a setting as to always operate the operation target apparatus regardless of the distance between the apparatuses. Alternatively, since the priority value becomes greater by setting the basic priority value to a greater value, for two apparatuses in which one apparatus is conceived to greatly influence the other apparatus, the basic priority value may be set to a relatively great value. Alternatively still, as the execution determination value becomes smaller, it becomes likely to be determined at step S6 of FIG. 4 that the operation target apparatus should be operated, and therefore for two apparatuses in which one apparatus is conceived to greatly influence the other apparatus, the execution determination value may be set to a relatively small value.

As described above, in the first embodiment, by varying the size of the execution determination value, the basic priority, or the distance coefficient, it is made possible to change the condition of the control rule. Further, in the first embodiment, the execution determination value, the basic priority value and the distance coefficient are set for each set of the notification apparatus and the operation target apparatus, and therefore a different condition can be set for each set of the notification apparatus and the operation target apparatus. Accordingly, it is possible to set such a control rule as to take account not only of the distance between apparatuses but also of the types of apparatuses.

The first embodiment has been described by taking the television set, the radio and the telephone as examples of the apparatus for outputting sound. However, the "apparatus for outputting sound" is not limited to an apparatus intended for outputting sound. The concept of the "apparatus for outputting sound" includes any apparatus which generates sound during operation, e.g., a microwave oven or a washing machine. In a case where the apparatus operating system includes the microwave oven and the washing machine, the following control is performed. For example, in a case of turning on the microwave oven when the television set is in operation, the control server 4 operates the television set such that the sound level thereof is raised. This automatically prevents the sound of the television set from becoming hard to hear due to an operating sound of the microwave oven.

Figure 5:
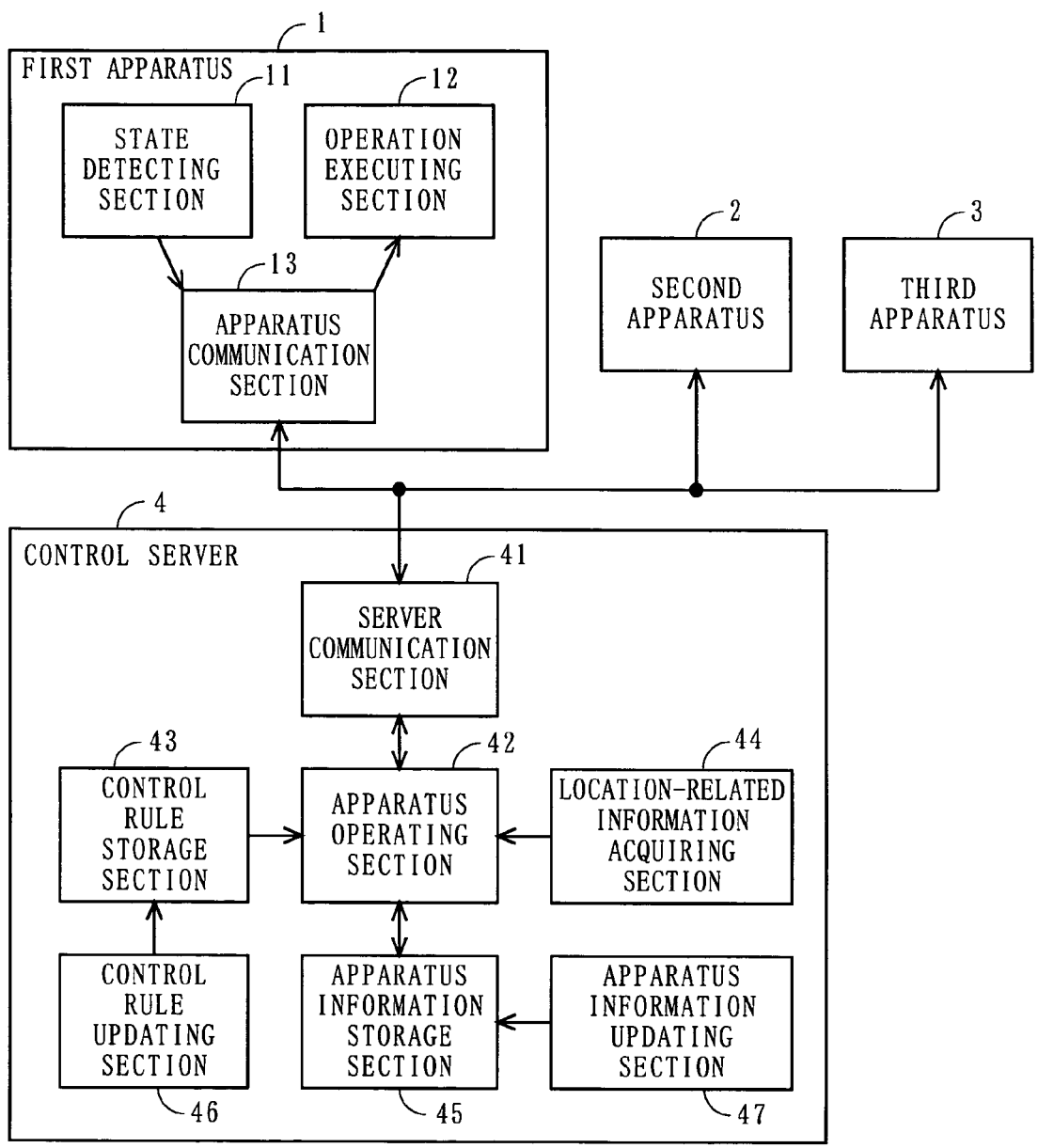
FIG. 5 is a block diagram illustrating a structure of an apparatus operating system according to a variation of the first embodiment.

A possible variation of the first embodiment will be described below. FIG. 5 is a block diagram illustrating structure of an apparatus operating system according to a variation of the first embodiment. In FIG. 5, elements similar to those shown in FIG. 1 are denoted by the same reference numerals as in FIG. 1, and descriptions thereof are omitted.

Referring to FIG. 5, in addition to the elements shown in FIG. 1, the control server 4 further includes an apparatus information storage section 45, a control rule updating section 46, and an apparatus information updating section 47. The apparatus information storage section 45 has stored therein apparatus information related to an apparatus included in the apparatus operating system. The control rule updating section 46 updates details of the control rule stored in the control rule storage section 43. The apparatus information updating section updates details of the apparatus information stored in the apparatus information storage section 45.

As shown in FIG. 5, the control server 4 may further include the control rule updating section 46. The control rule updating section 46 is typically realized by an input device, and is operable to receive user inputs. Further, the control rule updating section 46 updates the details of the control rule in accordance with a user's instruction. Thus, the user is able to freely change a previously set control rule. In a case where the control server 4 is connected to, for example, the Internet, so that the control server 4 is able to communicate with an external apparatus which is not included in the apparatus operating system, the control server 4 may acquire a new control rule from the external apparatus via the Internet to update the previously set control rule.

Further, as shown in FIG. 5, the control server 4 may further include the apparatus information storage section 45. The apparatus information storage section 45 is formed by a storage device such as a RAM. FIG. 6 is a table illustrating an example of the apparatus information stored in the apparatus information storage section 45 shown in FIG. 5. In the table of the apparatus information shown in FIG. 6, apparatus IDs, apparatus types, and state information are associated with each other.

Each apparatus ID identifies an apparatus included in the apparatus operating system. In the above-described first embodiment, although each apparatus is identified by its name, the apparatus ID may be used in the first embodiment as in this variation. In a case of using the apparatus ID, a notification signal transmitted from each of the first through third apparatuses 1 through 3 contains the apparatus ID and a post-change output state. The apparatus ID is also used in the control rule to identify each apparatus.

Each apparatus type indicates a type of an apparatus such as a television set or a radio. The state information indicates a current output state of an apparatus. The control server 4 holds these apparatus types and output states therein, and therefore can obtain an output state of each apparatus. For example, details of the apparatus information are displayed on a display device (not shown) included in the control server 4, so that the user is able to recognize the output state of each apparatus.

The state information contained in the apparatus information is updated each time the control server 4 receives a notification signal from an apparatus. Specifically, the apparatus operating section 42 updates the state information based on the apparatus ID and the output state contained in the notification signal transmitted from the apparatus. Thus, the state information is always updated to latest information. Note that the control server 4 may be provided with the apparatus information updating section 47 to update the apparatus information. With the apparatus information updating section 47, the apparatus information can be updated as in the case of the control rule, and therefore the operating system can readily deal with an addition of a new apparatus thereto.

Second Embodiment

An apparatus operating system according to a second embodiment of the present invention will be described below. Structure of the apparatus operating system according to the second embodiment is similar to that of the apparatus operating system according to the first embodiment shown in FIG. 1. Following descriptions are mainly directed to differences between the first and second embodiments.

In the second embodiment, control rule storage section 43 has stored therein time information as well as a control rule as shown in FIG. 2. FIG. 7 is a table illustrating an example of the time information stored in the control rule storage section 43. As shown in the table of FIG. 7, in the time information, time is associated with time coefficients. Each time coefficient is used for calculating a priority value. Specifically, in the second embodiment, apparatus operating section 42 calculates the priority value using the time coefficient as well as a basic priority value, a distance coefficient and location-related information. More specifically, the apparatus operating section 42 receives a notification signal from an apparatus (see, for example, step S3 of FIG. 4), and thereafter refers to the time information to identify a value of a time coefficient associated with current time. Further, the apparatus operating section 42 calculates the priority value by substituting the identified time coefficient into the following expression (2).

(Priority value)=(Basic priority value)−(Distance between apparatuses)×(Distance coefficient)+ (Time coefficient)     (2)

In this manner, in the second embodiment, the apparatus operating section 42 is able to determine based on the current time whether to operate the operation target apparatus. Accordingly, details of the control rule can be changed in accordance with the current time. For example, it is possible to set the control rule in such a manner that sound level of a radio takes priority over sound levels of other apparatuses during daytime and a sound level of the television set takes priority over sound levels of other apparatuses during nighttime.

As described above, in the second embodiment, the details of the control rule are changed in accordance with the current time. However, in other embodiments, the control rule storage section 43 may have stored therein control rules each corresponding to a different time slot, so that the apparatus operating section 42 can select and use a proper one of the control rules in accordance with the current time.

Third Embodiment

An apparatus operating system according to a third embodiment of the present invention will be described below.

Figure 8:
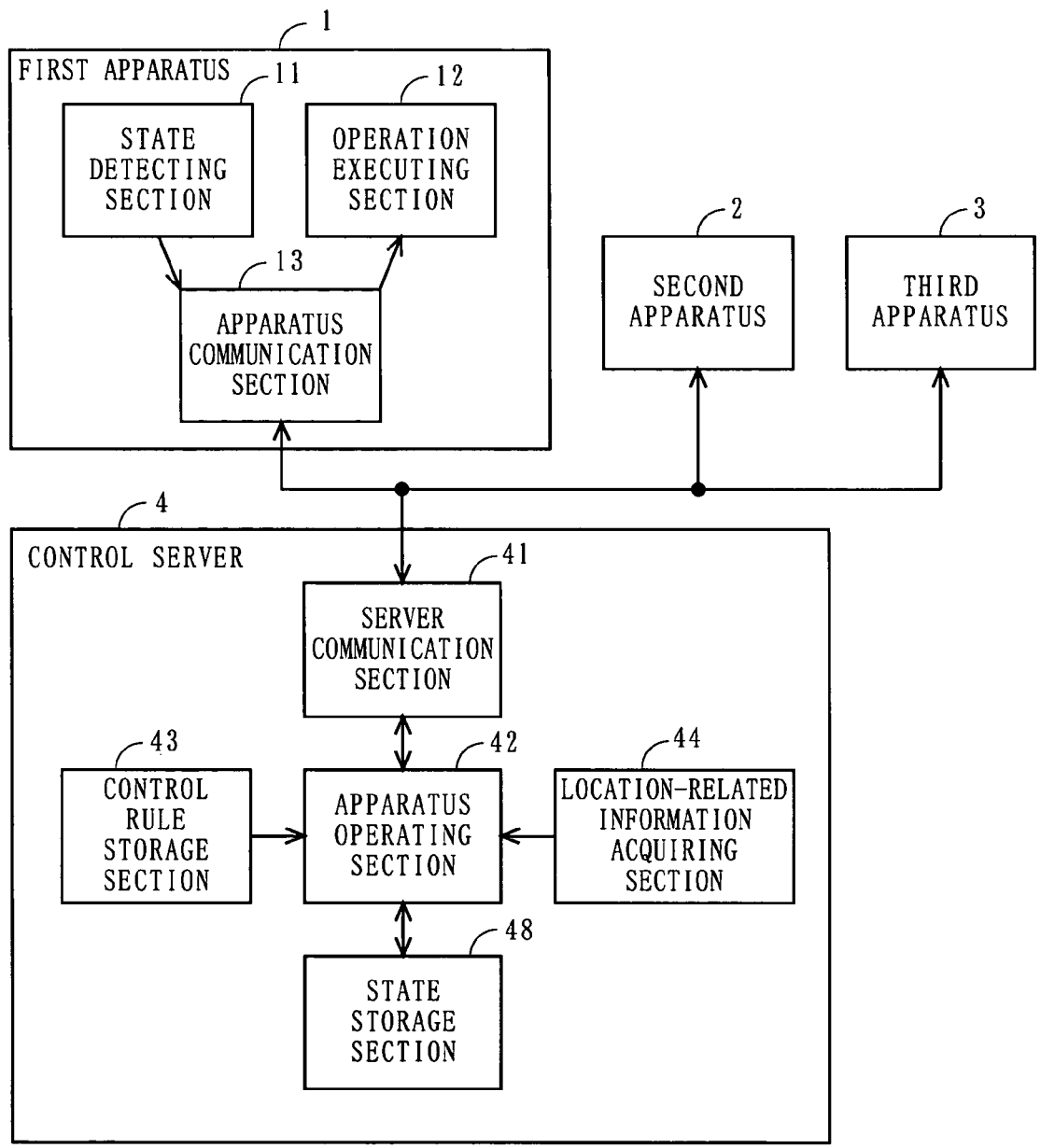
FIG. 8 is a block diagram illustrating structure of an apparatus operating system according to a third embodiment of the present invention.

FIG. 8 is a block diagram illustrating structure of the apparatus operating system according to the third embodiment of the present invention. In FIG. 8, elements similar to those shown in FIG. 1 are denoted by the same reference numerals as in FIG. 1, and descriptions thereof are omitted. Following descriptions are mainly directed to differences between the first and third embodiment.

Referring to FIG. 8, in addition to the elements shown in FIG. 1, the control server 4 further includes a state storage section 48. The state storage section 48 is formed by a storage device such as a RAM, and has stored therein an output state of an operation target apparatus on which no operation has been performed.

In the third embodiment, a state detecting section of each apparatus detects that a user has performed an operation of changing an output state, thereby detecting a change of the output state of the apparatus. Specifically, the state detecting section detects an operation of raising/lowering sound level and an operation of turning on/off the apparatus. In response to this detection by the state detecting section, the apparatus communication section transmits a notification signal to the control server 4.

FIG. 9 is a table illustrating an exemplary control rule used in the third embodiment. Note that in the third embodiment, each of the first through third apparatuses 1 through 3 is a television set, a radio, or an intercom, and FIG. 9 only shows a control rule related to a case where the intercom is operated. In FIG. 9, as an output state to be taken by an operation target apparatus, the item "SOUND LEVEL 0, RESTORED 3 SEC. LATER" is defined. This item represents that after an output state of zero sound level is continued for three seconds, the sound level is restored to its original state.

Figure 10:
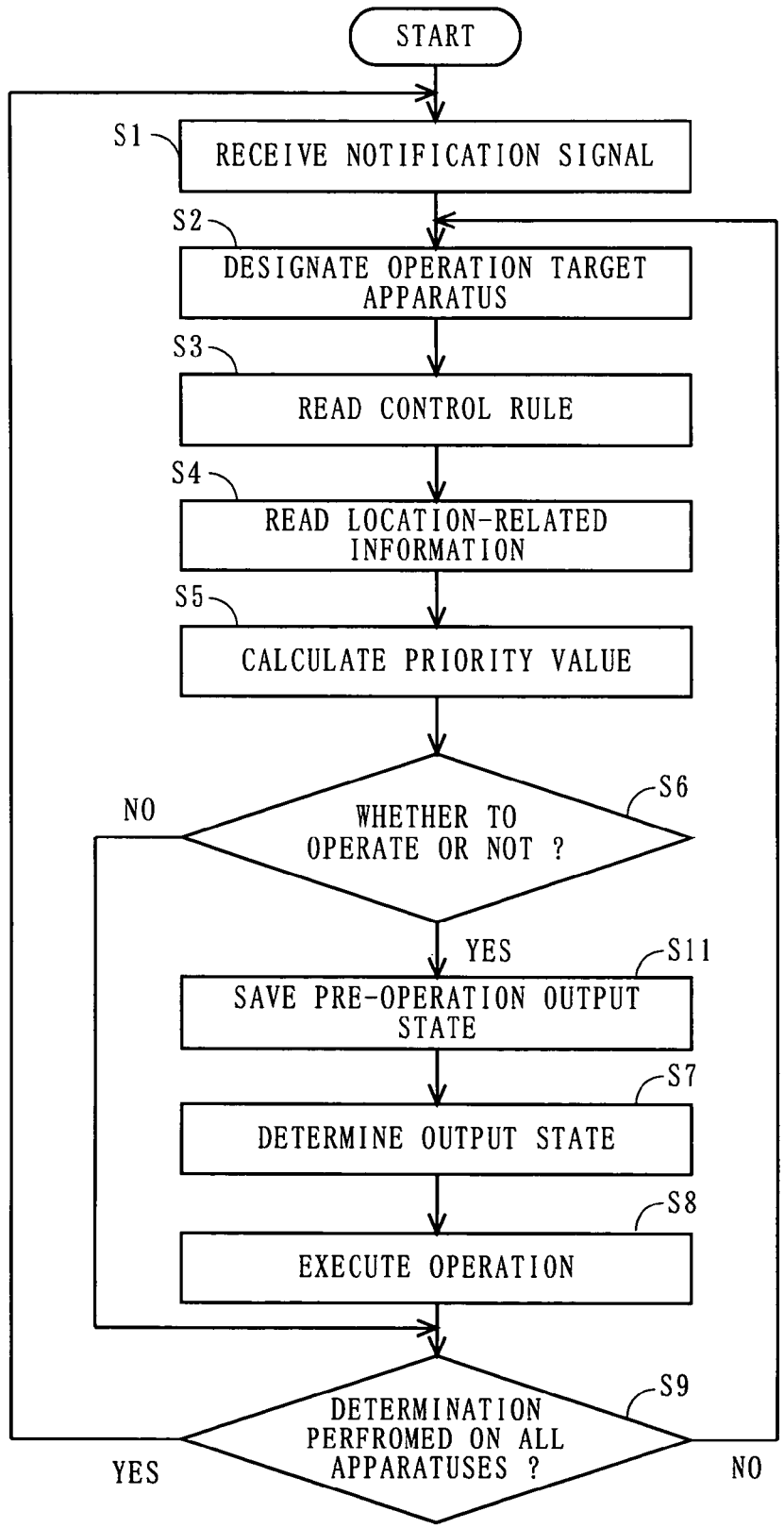
FIG. 10 is a flowchart showing a flow of a procedure of a control server 4 shown in FIG. 8.

FIG. 10 is a flowchart showing a flow of a procedure in control server 4 shown in FIG. 8. Following descriptions are mainly directed to differences of FIG. 10 with respect to FIG. 4. In FIG. 10, steps S1 through S6 are as described in the first embodiment.

If a determination result at step S6 is positive, apparatus operating section 42 saves into state storage section 48 a current output state of the operation target apparatus designated at step S2 (i.e., a pre-operation output state) (step S11). Specifically, the apparatus operating section 42 requests the operation target apparatus designated at step S2 to transmit the current output state. In response to the request, the operating target apparatus transmits information indicative of the current output state to the control server 4. The apparatus operating section 42 saves the information transmitted from the operation target apparatus into the state storage section 48.

At next step S7, the apparatus operating section 42 determines an operation state to be taken by the operation target apparatus designated at step S2. At following step S8, the apparatus operating section 42 operates the operation target apparatus designated at step S2 so as to transition into the output state determined at step S7. In the third embodiment, although processing of steps S7 and S8 is performed in a manner as described in the first embodiment, the control rule shown in FIG. 9 is used instead of using the control rule as shown in FIG. 2. Accordingly, for example, when a button of the intercom is depressed, the apparatus operating section 42 operates the television set and the radio such that their sound levels are reduced to zero and restored to their respective pre-operation output states three seconds later. In this case, the apparatus operating section 42 refers to information saved in the state storage section 48 in order to find pre-operation output states.

As described above, in the third embodiment, the pre-operation output states of the operation target apparatuses are saved into the state storage section 48, and therefore it is possible to temporarily change the output states of the operation target apparatuses, and thereafter to restore original output states. The third embodiment is useful when used in such a case that an output state of the operation target apparatus can be temporarily changed depending on a type of an apparatus or how to set the control rule. In the third embodiment, for example, when the intercom or the telephone rings, it is possible to readily implement an operation of temporarily reducing the sound level of an apparatus other than the intercom or the telephone.

As described above, the present invention makes it possible to automatically operate an apparatus based on an operation of another apparatus, thereby eliminating a user's effort to operate the apparatuses. Moreover, in the present invention, the location-related information is taken into consideration for operating the apparatuses, and therefore the apparatus operating system is able to control the apparatuses in consideration of a relationship between the apparatuses. Specifically, the apparatus operating system is able to control the apparatuses in such a manner that the apparatuses are operated only when necessary or details of the operation vary in accordance with, for example, a distance between the apparatuses.

Figure 11:
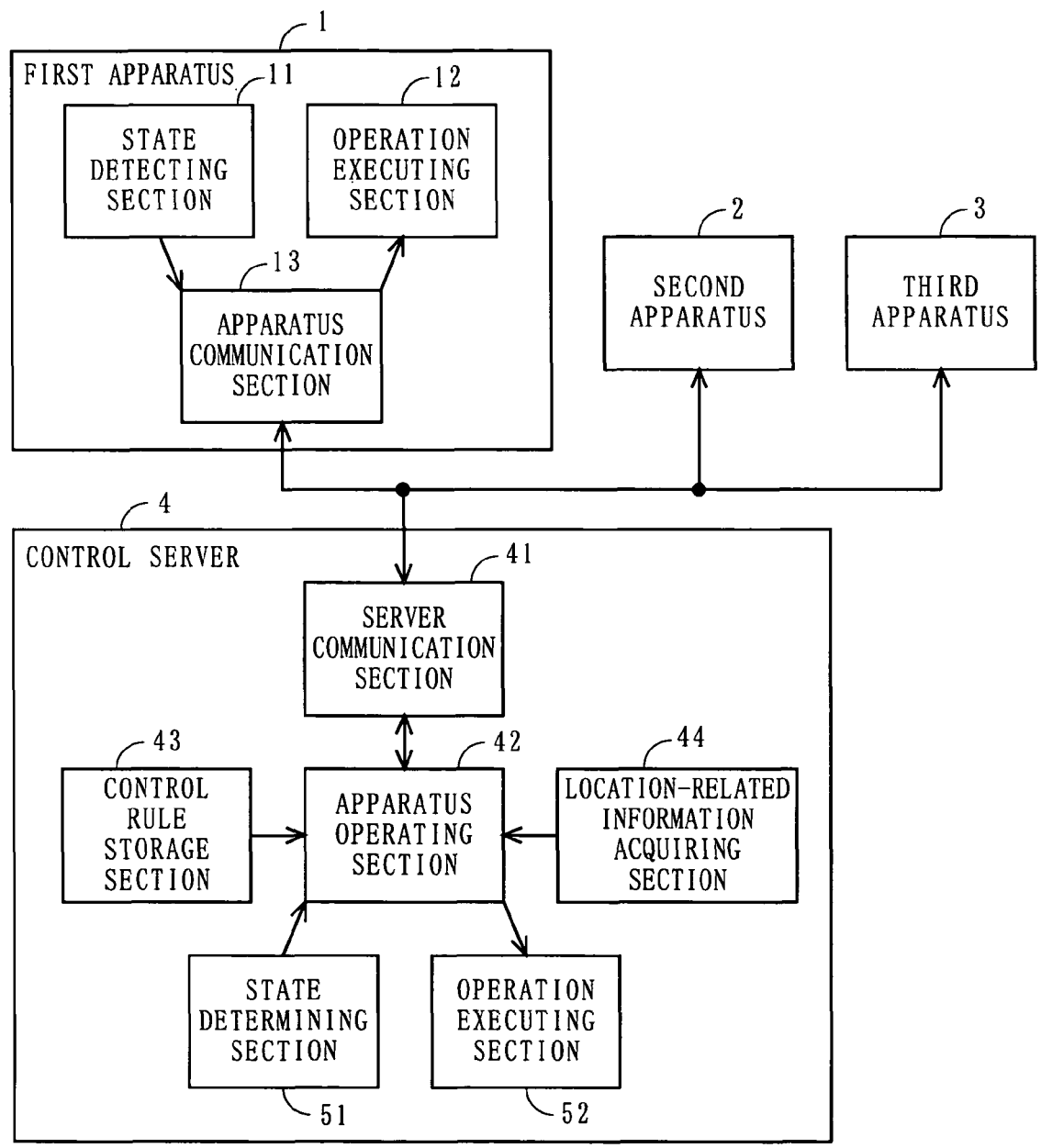
FIG. 11 is a block diagram illustrating structure of an apparatus operating system according to another embodiment of the present invention.

In the first through third embodiments, the control server 4 is used for controlling each of the first through third apparatuses 1 through 3 and does not provide output of the same type as output of each of the first through third apparatuses 1 through 3. However, in other embodiments, the control server 4 may provide output of the same type as output of each of the first through third apparatuses 1 through 3. FIG. 11 is a block diagram illustrating structure of an apparatus operating system according to another embodiment of the present invention. As shown in FIG. 11, control server 4 may include a state detecting section 51 and an operation executing section 52. Note that the state detecting section 51 is the same as the aforementioned state detecting section included in each apparatus, and the operation executing section 52 is the same as the aforementioned operation executing section included in each apparatus.

Further, in the first through third embodiment, the control server 4 operates the operation target apparatus(es), i.e., an apparatus(es) other than an apparatus having transmitted a notification signal. However, in other embodiments, the apparatus having transmitted the notification signal, as well as the operation target apparatus(es), may be operated. For example, in the control rule as shown in FIG. 2, the same apparatus is simultaneously defined as the "NOTIFICATION APPARATUS" and the "OPERATION TARGET APPARATUS".

Further still, in the first through third embodiments, the control server 4 may operate the operation target apparatus before the apparatus having transmitted the notification signal actually changes its output state. Specifically, each apparatus included in the apparatus operating system may be operated in the following manner. The state detecting section of each apparatus detects that a user has performed an operation of changing the output state, thereby detecting a change of the output state of the apparatus. In response to this, the apparatus communication section transmits a notification signal to the control server 4. Then, the control server 4 operates the operation target apparatus. After completion of this operation, the operation target apparatus notifies the control server 4 of the completion of the operation. After receiving the notification, the control server 4 notifies this notification apparatus of the completion of the operation. After receiving this notification, the operation executing section of the notification apparatus operates the notification apparatus. In the above-described manner, the output state of the operation target apparatus changes before the output state of the notification apparatus operated by the user changes. For example, in a case of raising the sound level of the notification apparatus and lowering the sound level of the operation target apparatus, the sound level of the operation target apparatus is lowered before raising the sound level of the notification apparatus, and therefore there is no possibility of a user feeling uncomfortable about the sound levels of the apparatuses.

Further still, in the first through third embodiments, the "apparatuses for outputting sound" have been described as an example of the apparatuses providing output of the same type. However, each apparatus included in the apparatus operating system of the present invention is not limited to the apparatus for outputting sound, and may be a heating or air-conditioning apparatus such as air-conditioner/heater, an electric heater or an electric carpet. In such a case, an output state to be controlled is a state of temperature set by each apparatus. For example, in a case of turning on the air-conditioner/heater when the electric carpet is in operation, it is conceivable that the control server lowers a set temperature of the electric carpet. In this case, as in the first through third embodiments, it is possible to eliminate a user's effort to operate the apparatuses.

While the invention has been described in detail, the foregoing description is in all aspects illustrative and not restrictive. It is understood that numerous other modifications and variations can be devised without departing from the scope of the invention.

What is claimed is:

1. A control server which controls an output of a first apparatus and an output of a second apparatus which is different from the first apparatus, the control server comprising:
a communication section for receiving, from the first apparatus when an output of the first apparatus changes, a first notification signal which indicates an output state of the first apparatus, and for receiving, from the second apparatus when an output of the second apparatus changes, a second notification signal which indicates an output state of the second apparatus;
a control rule storage section for storing a first control rule which describes a numerical value that indicates a first predetermined distance which is a basis to determine whether or not the output state of the second apparatus is to be changed in response to the first notification signal, and for storing a second control rule which describes a numerical value that indicates a second predetermined distance which is a basis to determine whether or not the output state of the first apparatus is to be changed in response to the second notification signal;
a determination section for acquiring, when the first notification signal is received, an inter-apparatus distance from the first apparatus to the second apparatus and determining whether the inter-apparatus distance is equal to or smaller than the first predetermined distance indicated by the numerical value described in the first control rule or is larger than the first predetermined distance, and for acquiring, when the second notification signal is received, an inter-apparatus distance from the second apparatus to the first apparatus and determining whether the inter-apparatus distance is equal to or smaller than the second predetermined distance indicated by the numerical value described in the second control rule or is larger than the second predetermined distance; and
an apparatus operation section for not changing the output state of the second apparatus when the inter-apparatus distance from the first apparatus to the second apparatus is determined to be larger than the first predetermined distance and changing the output state of the second apparatus when the inter-apparatus distance is determined to be equal to or smaller than the first predetermined distance, and for not changing the output state of the first apparatus when the inter-apparatus distance from the second apparatus to the first apparatus is determined to be larger than the second predetermined distance and changing the output state of the first apparatus when the inter-apparatus distance is determined to be equal to or smaller than the second predetermined distance.

2. The control server according to claim 1, wherein
the first control rule stored in the control rule storage section further has described therein a content of an output state which is to be adopted when the output state of the second apparatus is changed in accordance with the output state of the first apparatus indicated by the first notification signal,
the second control rule stored in the control rule storage section further has described therein a content of an output state which is to be adopted when the output state of the first apparatus is changed in accordance with the output state of the second apparatus indicated by the second notification signal, and
the apparatus operation section changes, when the inter-apparatus distance from the first apparatus to the second apparatus is determined to be equal to or smaller than the first predetermined distance, the output state of the second apparatus to the content of the to-be-adopted output state described in the first control rule, and changes, when the inter-apparatus distance from the second apparatus to the first apparatus is determined to be equal to or smaller than the second predetermined distance, the output state of the first apparatus to the content of the to-be-adopted output state described in the second control rule.

3. The control server according to claim 2, wherein
the first notification signal includes information indicating change in a sound level of the first apparatus or information indicating change in ON/OFF state of power of the first apparatus, and
the apparatus operation section conducts, when the inter-apparatus distance is determined to be equal to or smaller than the first predetermined distance, either lowering of a sound level of the second apparatus or turning OFF of power of the second apparatus, if the first notification signal received from the communication section indicates an increase in the sound level of the first apparatus or if the first notification signal indicates turning ON of power of the first apparatus.

4. The control server according to claim 2, wherein
the first notification signal includes information indicating change in a sound level of the first apparatus or information indicating change in ON/OFF state of power of the first apparatus, and
the apparatus operation section conducts, when the inter-apparatus distance is determined to be equal to or smaller than the first predetermined distance, either raising of a sound level of the second apparatus or turning ON of power of the second apparatus, if the first notification signal received from the communication section indicates a decrease in the sound level of the first apparatus or if the first notification signal indicates turning OFF of power of the first apparatus.

5. The control server according to claim 2, wherein
the first apparatus is an apparatus that generates noise during operation, and the second apparatus is an apparatus that outputs audio,
the first notification signal includes information indicating change in a sound level of the noise generated from the first apparatus, or information indicating change in ON/OFF state of power of the first apparatus, and
the apparatus operation section raises, when the inter-apparatus distance is determined to be equal to or smaller than the first predetermined distance, the sound level of the second apparatus, if the first notification signal received from the communication section indicates an increase in noise of the first apparatus or if the first notification signal indicates turning ON of the power of the first apparatus.

6. An apparatus operation method used in a control server which controls an output of a first apparatus and an output of a second apparatus which is different from the first apparatus, the control server having stored therein in advance, a first control rule which is transmitted from the first apparatus when an output of the first apparatus changes and which describes a numerical value that indicates a first predetermined distance which is a basis to determine whether or not an output state of the second apparatus is to be changed in response to a first notification signal indicating an output state of the first apparatus, and a second control rule which is transmitted from the second apparatus when an output of the second apparatus changes and which describes a numerical value that indicates a second predetermined distance which is a basis to determine whether or not an output state of the first apparatus is to be changed in response to a second notification signal indicating an output state of the second apparatus,
the method comprising:
a communication step of receiving the first notification signal from the first apparatus, and receiving the second notification signal from the second apparatus;
a determination step of acquiring, when the first notification signal is received, an inter-apparatus distance from the first apparatus to the second apparatus and determining whether the inter-apparatus distance is equal to or smaller than the first predetermined distance indicated by the numerical value described in the first control rule or is larger than the first predetermined distance, and of acquiring, when the second notification signal is received, an inter-apparatus distance from the second apparatus to the first apparatus and determining whether the inter-apparatus distance is equal to or smaller than the second predetermined distance indicated by the numerical value described in the second control rule or is larger than the second predetermined distance; and
an apparatus operation step of not changing the output state of the second apparatus when the inter-apparatus distance from the first apparatus to the second apparatus is determined to be larger than the first predetermined distance and changing the output state of the second apparatus when the inter-apparatus distance is determined to be equal to or smaller than the first predetermined distance, and of not changing the output state of the first apparatus when the inter-apparatus distance from the second apparatus to the first apparatus is determined to be larger than the second predetermined distance and changing the output state of the first apparatus when the inter-apparatus distance is determined to be equal to or smaller than the second predetermined distance.

* * * * *